United States Patent
Larson

(10) Patent No.: US 10,807,734 B2
(45) Date of Patent: Oct. 20, 2020

(54) TENSIONING DEVICE FOR AIRCRAFT REFUELING BOOM HOIST

(71) Applicant: Moog Inc., East Aurora, NY (US)

(72) Inventor: Lowell Van Lund Larson, Huntington Beach, CA (US)

(73) Assignee: Moog, Inc., East Aurora, NY (US)

( * ) Notice: Subject to any disclaimer, the term of this patent is extended or adjusted under 35 U.S.C. 154(b) by 436 days.

(21) Appl. No.: 15/196,817

(22) Filed: Jun. 29, 2016

(65) Prior Publication Data

US 2016/0304212 A1 Oct. 20, 2016

Related U.S. Application Data

(62) Division of application No. 13/687,484, filed on Nov. 28, 2012, now abandoned.

(51) Int. Cl.
*B64D 39/00* (2006.01)
*B65H 59/38* (2006.01)

(52) U.S. Cl.
CPC ............. *B64D 39/00* (2013.01); *B65H 59/38* (2013.01)

(58) Field of Classification Search
CPC ........ B64D 39/02; B64D 39/04; B64D 39/06; B66C 13/10; B66D 1/16; B66D 1/18; B66D 1/24; B66D 1/40; B66D 1/365; B66D 2700/0125; B66D 2700/025; B65H 59/382; B65H 59/38; H02G 11/02
USPC ...................................................... 212/262
See application file for complete search history.

(56) References Cited

U.S. PATENT DOCUMENTS

| | | | |
|---|---|---|---|
| 1,406,882 A | 2/1922 | Macaulay | |
| 1,654,424 A | 12/1927 | Heath | |
| 2,412,412 A * | 12/1946 | Meili | B66C 23/36 192/18 R |
| 2,663,523 A * | 12/1953 | Leisy | B64D 39/00 244/135 A |
| 2,879,016 A * | 3/1959 | Haase | B64D 39/02 244/135 A |
| 2,942,800 A * | 6/1960 | Torbett | A01K 89/0172 242/252 |
| 2,949,265 A | 9/1960 | Person | |

(Continued)

FOREIGN PATENT DOCUMENTS

| CN | 2709408 | 7/2005 |
|---|---|---|
| CN | 201240797 | 5/2009 |

(Continued)

*Primary Examiner* — Christopher D Hutchens
(74) *Attorney, Agent, or Firm* — Hodgson Russ LLP

(57) ABSTRACT

A power spring passively applies tension to a cable connected to an aircraft refueling boom. The power spring has a first end engaging a fixed arbor and second end engaging a rotatable spooling drum around which a portion of the cable is wound. The power spring biases the drum to rotate in a winding direction to apply tension to the cable, and the power spring stores energy when the drum rotates in an unwinding direction. The power spring may be located inside the drum or outside the drum. The drum may be actively driven by a motor that may be uncoupled from the drum to permit freewheeling rotation of the drum, wherein the power spring continues to apply tension to the cable. The invention eliminates reliance on one or more powered motors for removing unwanted slack in the cable.

13 Claims, 5 Drawing Sheets

(56) References Cited

U.S. PATENT DOCUMENTS

| | | | | |
|---|---|---|---|---|
| 2,995,321 | A | * | 8/1961 | Zeitler .................. B64D 39/02 244/135 A |
| 3,033,488 | A | * | 5/1962 | Weber ................... H02G 11/02 242/375.1 |
| 3,040,139 | A | * | 6/1962 | Appleton ............... H02G 11/02 191/12.2 R |
| 3,176,931 | A | | 4/1965 | Hannay |
| 3,400,230 | A | * | 9/1968 | Becker ................... H02G 11/02 191/12.2 R |
| 3,439,428 | A | | 4/1969 | Zelnick |
| 3,674,049 | A | | 7/1972 | Macgregor |
| 3,694,588 | A | * | 9/1972 | Appleton ............. B65H 75/486 191/12.2 A |
| 3,856,267 | A | * | 12/1974 | Flannelly ................ B66D 1/00 248/317 |
| 4,033,532 | A | * | 7/1977 | Bergquist ............. B25H 1/0028 248/324 |
| 4,053,118 | A | * | 10/1977 | Aikins ................... B65H 75/38 191/12.2 R |
| 4,072,283 | A | | 2/1978 | Weiland |
| 4,075,894 | A | * | 2/1978 | Therkildsen ............ B66D 1/24 74/15.69 |
| 4,129,270 | A | | 12/1978 | Robinson et al. |
| 4,231,200 | A | | 11/1980 | Henderson |
| 4,448,290 | A | | 5/1984 | Reid, Jr. et al. |
| 4,489,919 | A | * | 12/1984 | Ostrobrod .......... A62B 35/0093 182/232 |
| 4,534,384 | A | | 8/1985 | Graham et al. |
| 4,648,645 | A | | 3/1987 | Lundgren |
| 4,661,660 | A | * | 4/1987 | von Sothen ............ H02G 11/02 191/12.2 A |
| 5,374,035 | A | * | 12/1994 | Santos ..................... B66D 1/12 254/323 |
| 5,573,206 | A | | 11/1996 | Ward |
| 5,660,373 | A | | 8/1997 | Maslo et al. |
| 5,787,761 | A | | 8/1998 | Wang |
| 5,803,391 | A | | 9/1998 | Saperstein |
| 6,454,212 | B1 | | 9/2002 | Bartov |
| 6,604,711 | B1 | | 8/2003 | Stevens |
| 6,616,080 | B1 | * | 9/2003 | Edwards ............... A45C 7/0045 191/12.2 R |
| 6,718,649 | B1 | | 4/2004 | Critelli |
| 6,779,758 | B2 | | 8/2004 | Vu et al. |
| 6,866,228 | B2 | | 3/2005 | Bartov |
| 7,152,828 | B1 | | 12/2006 | Garcia |
| 7,422,179 | B2 | | 9/2008 | Mouskis |
| 7,472,868 | B2 | | 1/2009 | Schuster et al. |
| 7,878,455 | B2 | | 2/2011 | Lozano |
| 8,328,139 | B2 | | 12/2012 | Gasco Nunez |
| 9,102,412 | B2 | | 8/2015 | Cutler |
| 2004/0211856 | A1 | | 10/2004 | Blackman |
| 2009/0127394 | A1 | | 5/2009 | Adarve Lozano |
| 2009/0260922 | A1 | | 10/2009 | Marquardt et al. |

FOREIGN PATENT DOCUMENTS

| | | |
|---|---|---|
| GB | 879410 | 8/1946 |
| GB | 582046 | 11/1946 |
| GB | 911952 | 12/1962 |
| GB | 921186 | 3/1963 |
| WO | 2011093886 | 8/2011 |

\* cited by examiner

TENSIONING DEVICE FOR AIRCRAFT REFUELING BOOM HOIST

FIELD OF THE INVENTION

The present invention relates generally to aircraft refueling boom systems, and more particularly to cable hoist systems for supporting an aircraft refueling boom during deployment of the boom.

BACKGROUND OF THE INVENTION

Aerial refueling involves refueling one aircraft (the receiver aircraft) with fuel supplied from another aircraft (the tanker aircraft) during flight. A common refueling apparatus comprises a boom stowed in the tanker aircraft, wherein the boom carries a refueling line and is deployable by operation of a cable hoist mechanism. Known cable hoist mechanisms include a cable wound around a rotatable spool or drum and having a distal end attached to the refueling boom. The cable may be routed to the refueling boom by pulleys. Rotation of the drum may be powered by a hydraulic motor operable in raise, hold, and lower settings. The motor may also be placed in a "freewheel" setting wherein the motor is decoupled from the drum and the drum is permitted to rotate in a freewheeling manner.

While the boom is deployed during in-flight refueling, it is subject to variable lift and drag forces that may introduce unwanted slack in the cable. Tanker aircraft, such as KC-10 and KC-135 tankers now in service, use a single hydraulic motor to maintain tension on the cable while the boom is deployed during an in-flight refueling operation to remove slack. Tensioning systems using two hydraulic motors in an active standby arrangement have also been proposed. Use of hydraulic tensioning motors increases the cost and complexity of onboard hydraulic systems, and risk of malfunction or failure is a concern.

SUMMARY OF THE INVENTION

The invention employs a power spring (also known as a "clock spring") for passively applying tension to a cable connected to an aircraft refueling boom. The power spring has a first end engaging a fixed arbor and second end engaging a rotatable spooling drum around which a portion of the cable is wound. The power spring biases the drum to rotate in a winding direction to apply tension to the cable, and the power spring stores energy when the drum rotates in an unwinding direction. Thus, the invention eliminates reliance on one or more powered motors for removing slack.

The power spring may be housed within the hollow spooling drum, thereby saving axial space. In one embodiment, a radially inner end of the power spring engages the fixed arbor and a radially outer end of the power spring engages the rotating drum. In another embodiment, the arbor and drum are configured such that a radially expanded portion of the arbor surrounds an inner hub portion of the drum, and the radially inner end of the power spring engages the drum while the radially outer end of the power spring engages the arbor. In a further embodiment, the power spring is located outside the drum.

The invention may be incorporated in a hoist system for the refueling boom that has a motor, for example a hydraulic motor or an electric motor, for actively driving the drum in a winding direction to raise and stow the boom and in an unwinding direction to deploy the boom. The motor may be connected to the drum by a clutch and gearing operable to selectively couple the motor to the drum, wherein the drum is in a freewheeling state when uncoupled from the motor and the power spring applies tension to the cable when the drum is in the freewheeling state. The gearing may comprise a differential gear train, and the clutch may be embodied as a brake arranged to act on an element of the differential gear train.

The invention also encompasses a method comprising the steps of providing a refueling boom, a cable connected to the refueling boom, and a drum, wherein a portion of the cable is wound around the drum and the drum is rotatable about an axis in a winding direction and an opposite unwinding direction, and passively applying force to the drum without the use of a motor to urge the drum to rotate in the winding direction to thereby passively apply tension to the cable.

BRIEF DESCRIPTION OF THE DRAWING VIEWS

Features and advantages of embodiments of the present disclosure will become apparent by reference to the following detailed description and drawings, in which.

DETAILED DESCRIPTION OF THE INVENTION

Figure 1:
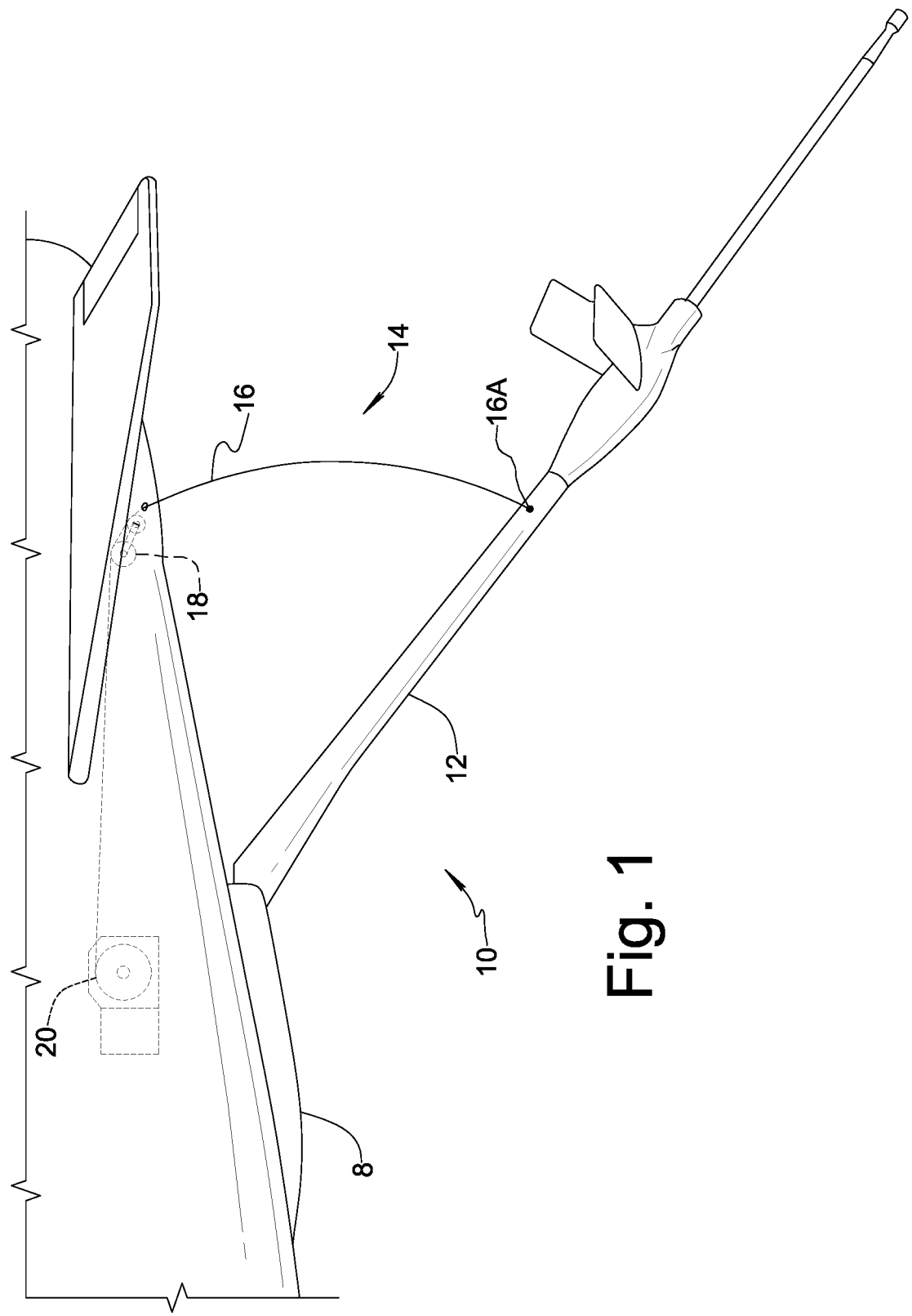
FIG. 1 is a schematic view showing an aircraft refueling boom system formed in accordance with an embodiment of the present invention.

FIG. 1 depicts an aircraft 8 having a refueling boom system 10 according to the present invention. Refueling boom system 10 comprises a refueling boom 12 that is deployable from a stowed position to a refueling position (depicted in FIG. 1) and is returnable from the refueling position to the stowed position. Refueling boom system 10 further comprises a hoist 14 used in deploying and returning the refueling boom 12. Hoist 14 includes a cable 16 having a distal end 16A attached to refueling boom 12. Cable 16 may pass through a pulley assembly 18 to a spooling drum 20. A portion of cable 16 is wound externally around drum 20.

Figure 2:
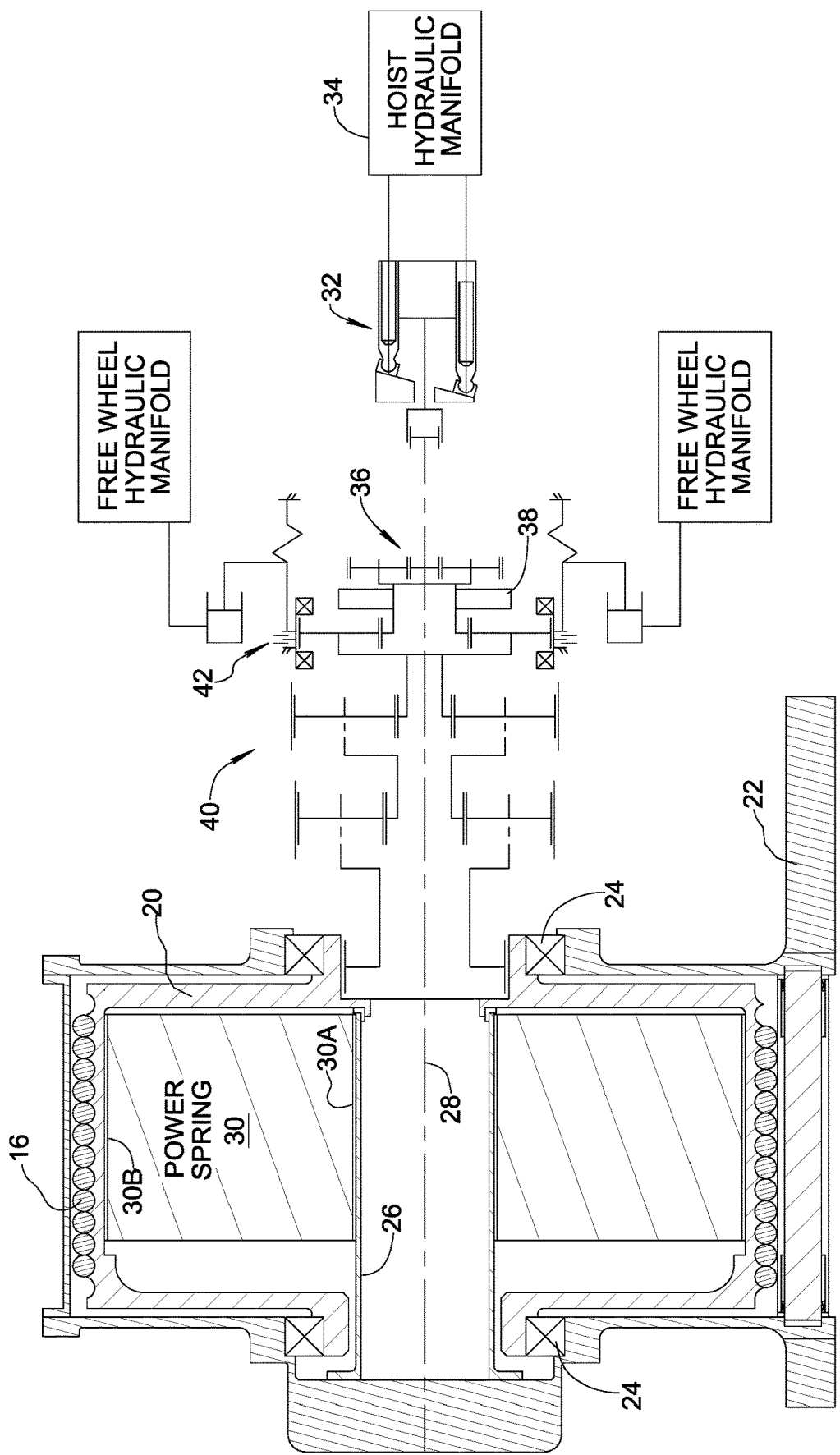
FIG. 2 is a schematic view showing a refueling boom hoist for use in the aircraft refueling boom system shown in FIG. 1, wherein the refueling boom hoist is formed in accordance with a first embodiment of the present invention.

FIG. 2 shows a first embodiment of hoist 14 in greater detail. Hoist 14 includes stationary housing 22 in which spooling drum 20 is mounted by rotary bearings 24, and an arbor 26 fixed to housing 22. Drum 20 is hollow and is mounted for rotation about an axis 28 relative to housing 22 and arbor 26. Arbor 26 is coaxially arranged with drum 20 on axis 28. In the embodiment shown, an external cylindrical surface of arbor 26 is radially inward with respect to an internal cylindrical wall surface of hollow drum 20.

Figure 3:
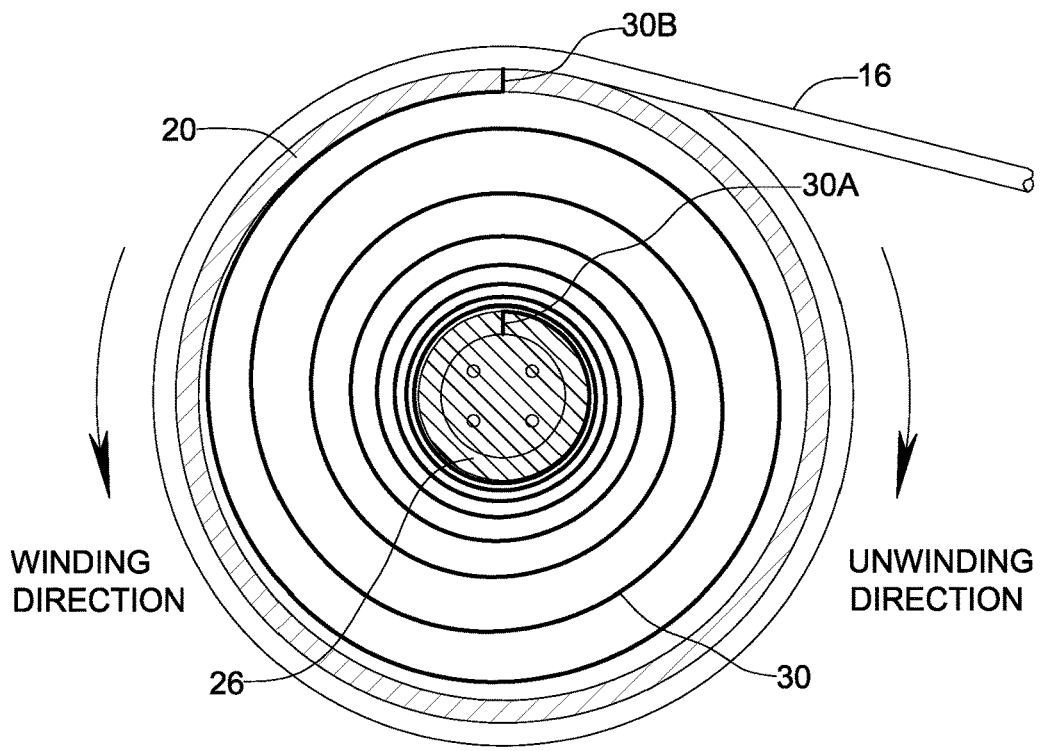
FIG. 3 is a schematic axial view of a cable drum, arbor, and power spring of the refueling boom hoist shown in FIG. 2.

Further reference is made now to FIG. 3 in conjunction with FIG. 2. In accordance with the present invention, a power spring 30 has a first end engaging arbor 26 and a second end 30B engaging drum 20. Power spring 30 biases drum 20 to rotate about axis 28 in a winding direction to apply tension to cable 16, and power spring 30 stores energy when drum 20 rotates in an unwinding direction. In the depicted embodiment, power spring 30 is housed within drum 20, and the first end (arbor-engaging end) of power spring 30 is a radially inner end 30A of the power spring, and the second end (drum-engaging end) of the power spring is a radially outer end 30B of the power spring.

Hoist 14 further comprises a motor 32 operable to rotate the drum in the winding direction raise refueling boom 12 toward its stowed position and in the unwinding direction to lower the refueling boom during deployment. Motor 32 may be a hydraulic motor as indicated schematically in FIG. 2, or another type of motor, for example an electric motor. Hydraulic motor 32 is in communication with a hydraulic manifold 34. The output of motor 32 is delivered through input gearing 36 to a torque limiter 38. The output of torque limiter 38 drives a differential gear train 40 arranged to rotate drum 20.

Motor 32 and differential gear train 40 may be selectively uncoupled from driving relationship with drum 20 to allow the drum to rotate in a freewheeling state. For this purpose, a "brake" mechanism 42 is operable to decouple mating elements of differential gear train 40 to introduce a drive gap in the gear train. Thus, brake mechanism 42 acts as a clutch. When brake mechanism 42 is activated, drum 20 is in a freewheeling state uncoupled from motor 32. In accordance with the present invention, power spring 30 applies tension to cable 16 when drum 20 is in the freewheeling state. When brake mechanism 42 is released, motor 32 and differential gear train 40 are again coupled to drum 20 in an active driving relationship. While FIG. 2 shows brake mechanism 42 arranged near an input portion of differential gear train 40, it is possible to arrange brake mechanism 42 anywhere along the differential gear train to provide a clutch. Brake mechanism 42 may be activated by a hydraulic drive means or by an electromagnetic means such as a solenoid.

As may be understood, power spring 30 passively applies force to drum 20, without the use of motor 32, to urge the drum to rotate in the winding direction to thereby passively apply tension to the cable 16.

By way of non-limiting example, drum 20 may be made of aluminum and have an inner diameter of about 10 inches (25.4 cm), arbor 26 may be made of aluminum and have an outer diameter of about 2 inches (5.08 cm), and power spring 30 may have a torque range that results in a minimum cable tension of about 90 pounds (400 N) and a maximum cable tension of about 150 pounds (667 N). By way of non-limiting example, a suitable power spring may be manufactured from a strip of spring steel that is 6 inches (15.24 cm) wide by 0.09 inches (0.229 cm) thick.

Figure 5:
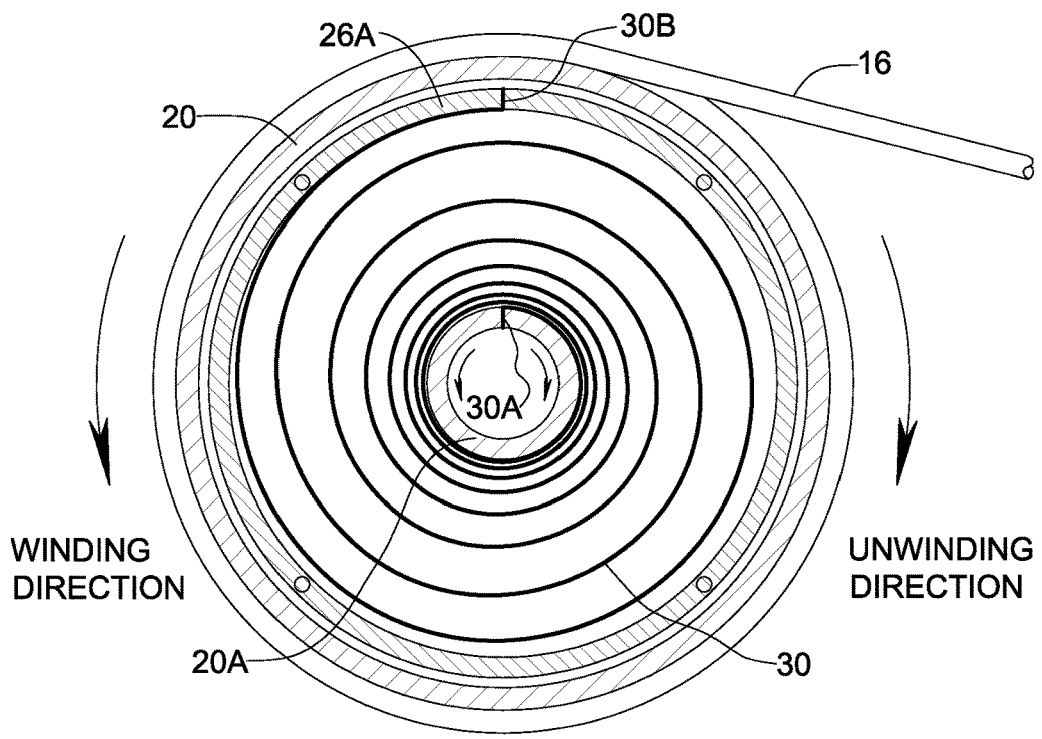
FIG. 5 is a schematic axial view of a cable drum, arbor, and power spring of the refueling boom hoist shown in FIG. 4.
Figure 4:
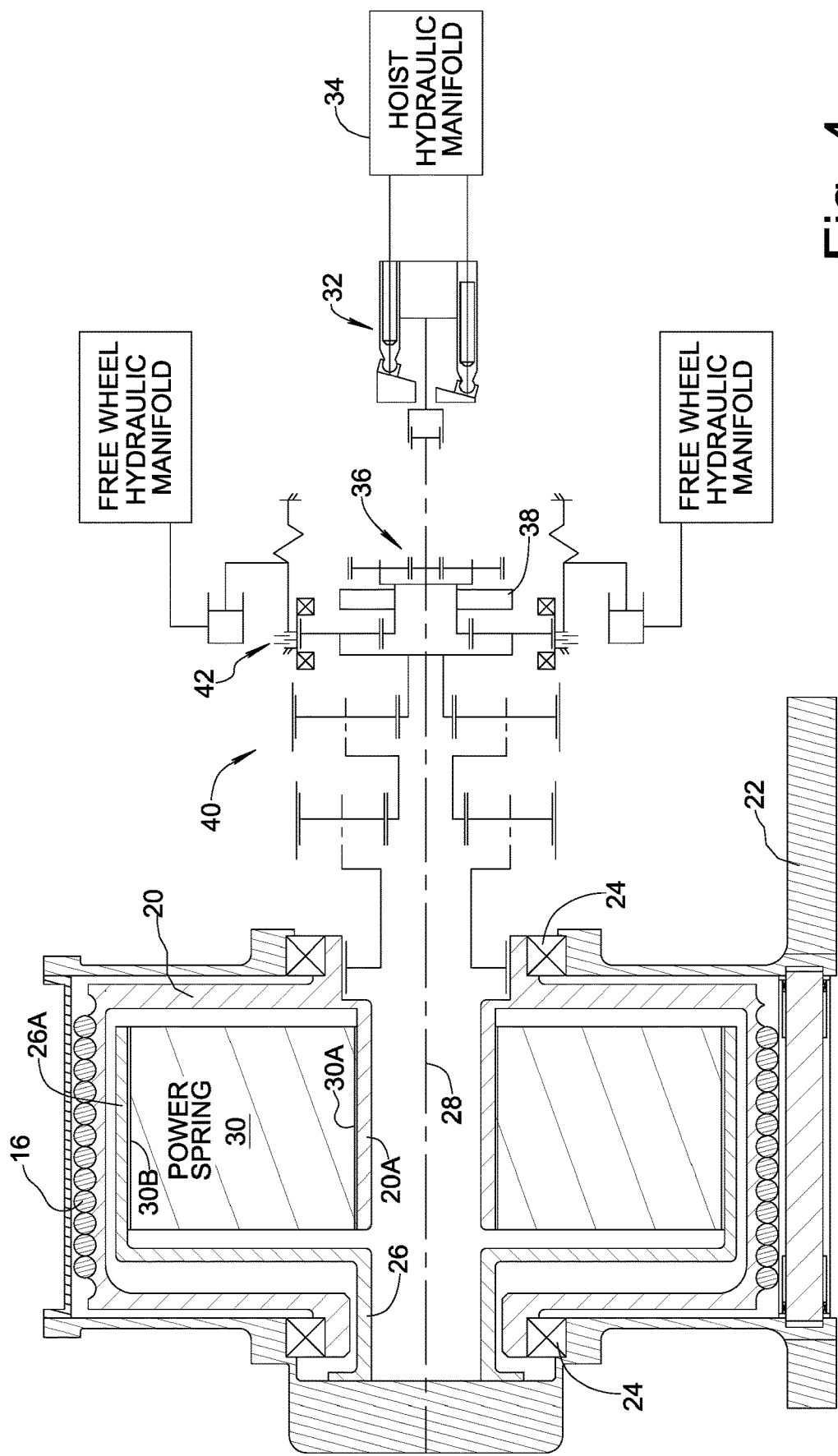
FIG. 4 is a schematic view showing a refueling boom hoist for use in the aircraft refueling boom system shown in FIG. 1, wherein the refueling boom hoist is formed in accordance with a second embodiment of the present invention.

Attention is now directed to FIGS. 4 and 5 showing a second embodiment of the present invention. In the second embodiment, arbor 26 again serves as a fixed mechanical ground engaged by one end of power spring 30, however the arbor and drum 20 are configured such that a radially expanded portion 26A of the arbor surrounds an inner hub portion 20A of drum 20. Consequently, fixed arbor 26 is engaged by radially outer end 30B of power spring 30, and rotatable drum 20 is engaged by radially inner end 30A of power spring 30. As may be understood, the second embodiment represents a lower inertia design compared to the first embodiment depicted in FIGS. 2 and 3.

Figure 6:
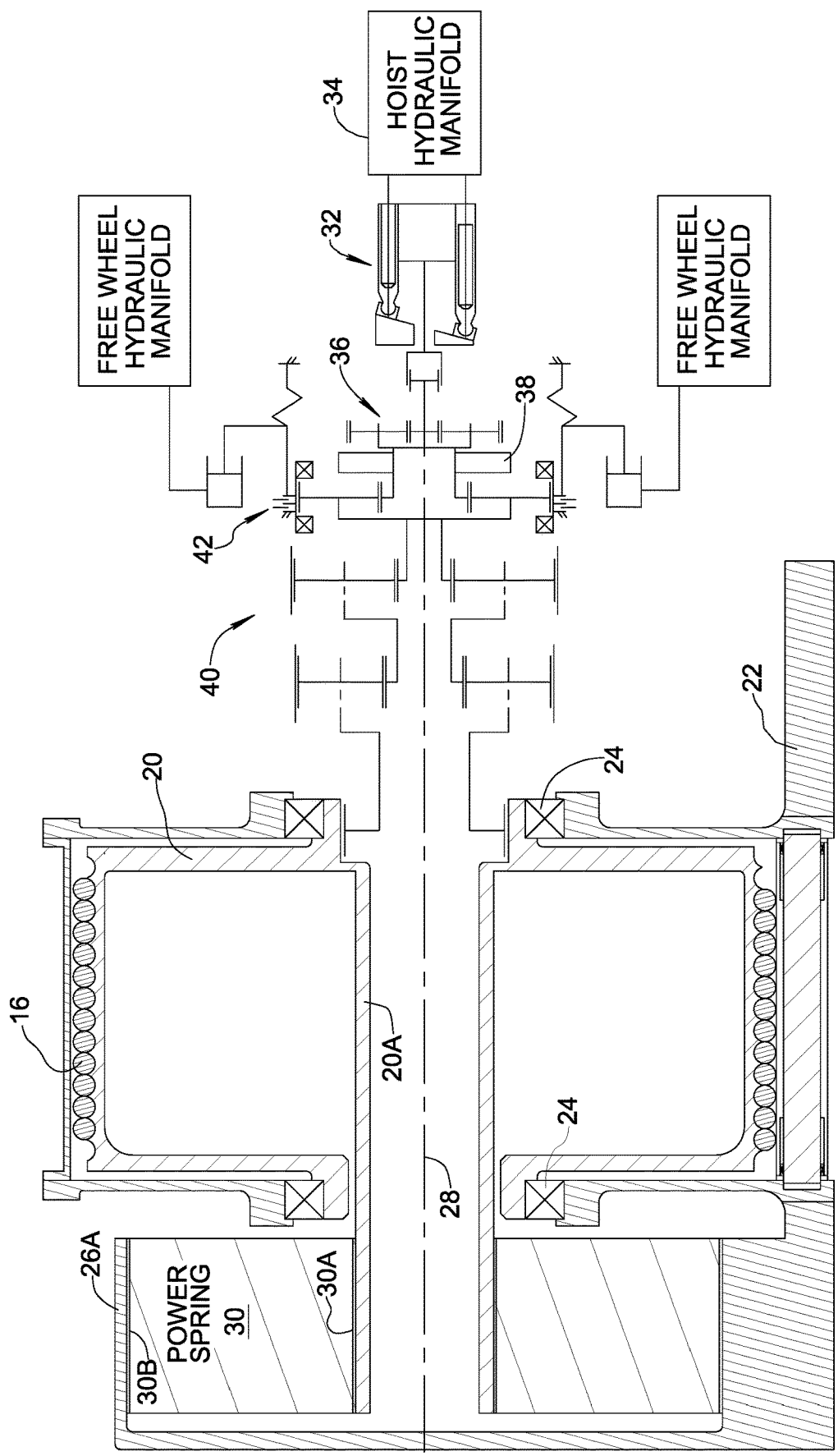
FIG. 6 is a schematic view showing a refueling boom hoist for use in the aircraft refueling boom system shown in FIG. 1, wherein the refueling boom hoist is formed in accordance with a third embodiment of the present invention.

In the first two embodiments, power spring 30 is housed within hollow drum 20. FIG. 6 illustrates a third embodiment of the present invention wherein power spring 30 is located outside of drum 20.

As may be appreciated, the present invention solves the problem of preventing a refueling boom hoist cable from going slack without reliance on a powered motor. The inventive solution carries with it other benefits. A weight reduction of about 10% is realized over designs incorporating active hydraulic motors for tensioning the cable. The invention has greater reliability than dual-motor hydraulic systems because its function does not depend on having two hydraulic systems available and all elements working in each hydraulic channel. Greater reliability is also achieved due to the high reliability of the power spring system to torque the drum, compared to relatively high failure rate of hundreds of parts in a speed summed dual hydraulic system.

Economic benefits include a lower recurring cost, estimated at about 40% less than systems using two hydraulic motors, because the motors are removed together with the complex manifold system and speed summing differential gearing associated therewith. A lower non-recurring cost, again about 40% less, is achieved because the daunting dynamic problem of controlling hydraulic motors through their stall and breakout point passively and in both directions while trying to maintain the same force on the cable is removed.

The cable tensioning force provided by the present invention does not vary significantly with temperature because the module of elasticity of steel used to make power spring 30 does not change much from −60 degrees F. to 120 degrees F., whereas hydraulic fluid properties change drastically with temperature.

Other benefits of the invention include lower maintenance burden for end users, lower hydraulic demand on the airframe, and reduced axial length because the power spring can be placed inside the cable drum (no additional space is required).

While the invention has been described in connection with exemplary embodiments, the detailed description is not intended to limit the scope of the invention to the particular forms set forth. The invention is intended to cover such alternatives, modifications and equivalents of the described embodiment as may be included within the spirit and scope of the invention.

LIST OF REFERENCE SIGNS 8 aircraft (tanker)
10 refueling boom system
12 refueling boom
14 hoist
16 cable
16A distal end of cable
18 pulley assembly
20 drum
20A inner hub portion of drum
22 stationary housing
24 rotary bearing
26 arbor
26A radially expanded portion of arbor
28 rotational axis of drum
30 power spring
30A radially inner end of power spring 30B radially outer end of power spring
32 motor
34 hydraulic manifold
36 input gearing
38 torque limiter
40 differential gear train
42 brake mechanism (acts as clutch)

What is claimed is:

1. An apparatus for applying tension to a cable connected to an aircraft refueling boom, the apparatus comprising:
    an arbor including a radially expanded portion;
    a hollow drum rotatable about an axis relative to the arbor, a portion of the cable being wound externally around the drum, wherein the drum includes an inner hub portion surrounded by the radially expanded portion of the arbor;
    a power spring including a first end engaging the radially expanded portion of the arbor and a second end engaging the inner hub portion of the drum;
    wherein the power spring biases the drum to rotate in a winding direction to apply tension to the cable, and the power spring stores energy when the drum rotates in an unwinding direction;
    a motor operable to rotate the drum in the winding direction; and
    a clutch and gearing operable to selectively couple the motor to the drum, wherein the drum is in a freewheeling state when uncoupled from the motor and the power spring applies tension to the cable when the drum is in the freewheeling state;
    wherein the gearing comprises a differential gear train, and the clutch is arranged to act on an element of the differential gear train to decouple mating elements of the differential gear train to introduce a drive gap in the differential gear train.

2. The apparatus according to claim 1, wherein the motor is a hydraulic motor.

3. The apparatus according to claim 1, wherein the motor is an electric motor.

4. The apparatus according to claim 1, wherein the clutch is hydraulically actuated.

5. The apparatus according to claim 1, wherein the clutch is actuated by a solenoid.

6. The apparatus according to claim 1, wherein the radially expanded portion of the arbor is inside the drum.

7. The apparatus according to claim 1, wherein the radially expanded portion of the arbor is outside the drum.

8. An aircraft refueling boom system comprising:
    a refueling boom deployable from a stowed position to a refueling position and returnable from the refueling position to the stowed position;
    a cable connected to the refueling boom;
    a tensioning apparatus for applying tension to the cable, the tensioning apparatus comprising an arbor, a hollow drum rotatable about an axis relative to the arbor, and a power spring, wherein a portion of the cable is wound externally around the drum;
    wherein the arbor includes a radially expanded portion, the drum includes an inner hub portion surrounded by the radially expanded portion of the arbor, and the power spring includes a first end engaging the radially expanded portion of the arbor and a second end engaging the inner hub portion of the drum;
    wherein the power spring biases the drum to rotate in a winding direction to apply tension to the cable, and the power spring stores energy when the drum rotates in an unwinding direction.

9. The system according to claim 8 further comprising a motor operable to rotate the drum in the winding direction.

10. The system according to claim 9, further comprising a clutch and gearing operable to selectively couple the motor to the drum, wherein the drum is in a freewheeling state when uncoupled from the motor and the power spring applies tension to the cable when the drum is in the freewheeling state.

11. The system according to claim 10, wherein the gearing comprises a differential gear train, and the clutch is embodied as a brake arranged to act on an element of the differential gear train to decouple mating elements of the differential gear train to introduce a drive gap in the differential gear train.

12. The system according to claim 8, wherein the radially expanded portion of the arbor is inside the drum.

13. The system according to claim 8, wherein the radially expanded portion of the arbor is outside the drum.

* * * * *